(12) United States Patent
Chen

(10) Patent No.: US 7,063,093 B1
(45) Date of Patent: Jun. 20, 2006

(54) MANUAL CARWASH NOZZLE STRUCTURE

(75) Inventor: Chin-Yuan Chen, Chang-Hua Hsien (TW)

(73) Assignee: Shin Tai Spurt Water of the Garden Tools Co., Ltd., Changhua Hsien (TW)

( * ) Notice: Subject to any disclaimer, the term of this patent is extended or adjusted under 35 U.S.C. 154(b) by 266 days.

(21) Appl. No.: 10/704,946

(22) Filed: Nov. 12, 2003

(51) Int. Cl.
*B08B 3/02* (2006.01)

(52) U.S. Cl. .................. 134/100.1; 134/123; 134/198; 239/310

(58) Field of Classification Search ............... 134/198, 134/94.1, 100.1, 123; 239/310, 307, 317, 239/325; 137/604
See application file for complete search history.

(56) References Cited

U.S. PATENT DOCUMENTS

| | | | | |
|---|---|---|---|---|
| 1,964,576 A | * | 6/1934 | Horne | 422/282 |
| 2,058,901 A | * | 1/1936 | McPherson | 422/266 |
| 2,153,240 A | * | 4/1939 | Dailey et al. | 137/553 |
| 2,562,415 A | * | 7/1951 | Chase | 137/625.28 |
| 2,602,697 A | * | 7/1952 | Otto et al. | 422/282 |
| 2,965,309 A | * | 12/1960 | Parrott | 239/310 |
| 2,991,939 A | * | 7/1961 | Packard | 239/114 |
| 3,204,875 A | * | 9/1965 | Hall | 239/318 |
| 3,770,205 A | * | 11/1973 | Proctor et al. | 239/317 |
| 4,572,235 A | * | 2/1986 | Katzer et al. | 137/268 |
| 6,012,650 A | * | 1/2000 | Hadar | 239/317 |
| 6,402,043 B1 | * | 6/2002 | Cockerill | 236/78 D |

* cited by examiner

*Primary Examiner*—Frankie L. Stinson
(74) *Attorney, Agent, or Firm*—Alan D. Kamrath; Nikolai & Mersereau, P.A.

(57) ABSTRACT

A manual carwash nozzle structure includes a grip body, a barrel member, and a spray nozzle. The barrel member is formed of a connection body, an adjustment valve, and a detergent container. The connection body is provided with a water inlet in communication with a hose connector of the grip body, and a water outlet in communication with the water inlet and the spray nozzle. A bypass is jointly provided by the connection body and the adjustment valve, so as to allow a portion of incoming water in the water inlet to enter the detergent container in which a water-detergent mixture is formed. The mixture is let out of the container into the water outlet via the bypass.

1 Claim, 6 Drawing Sheets

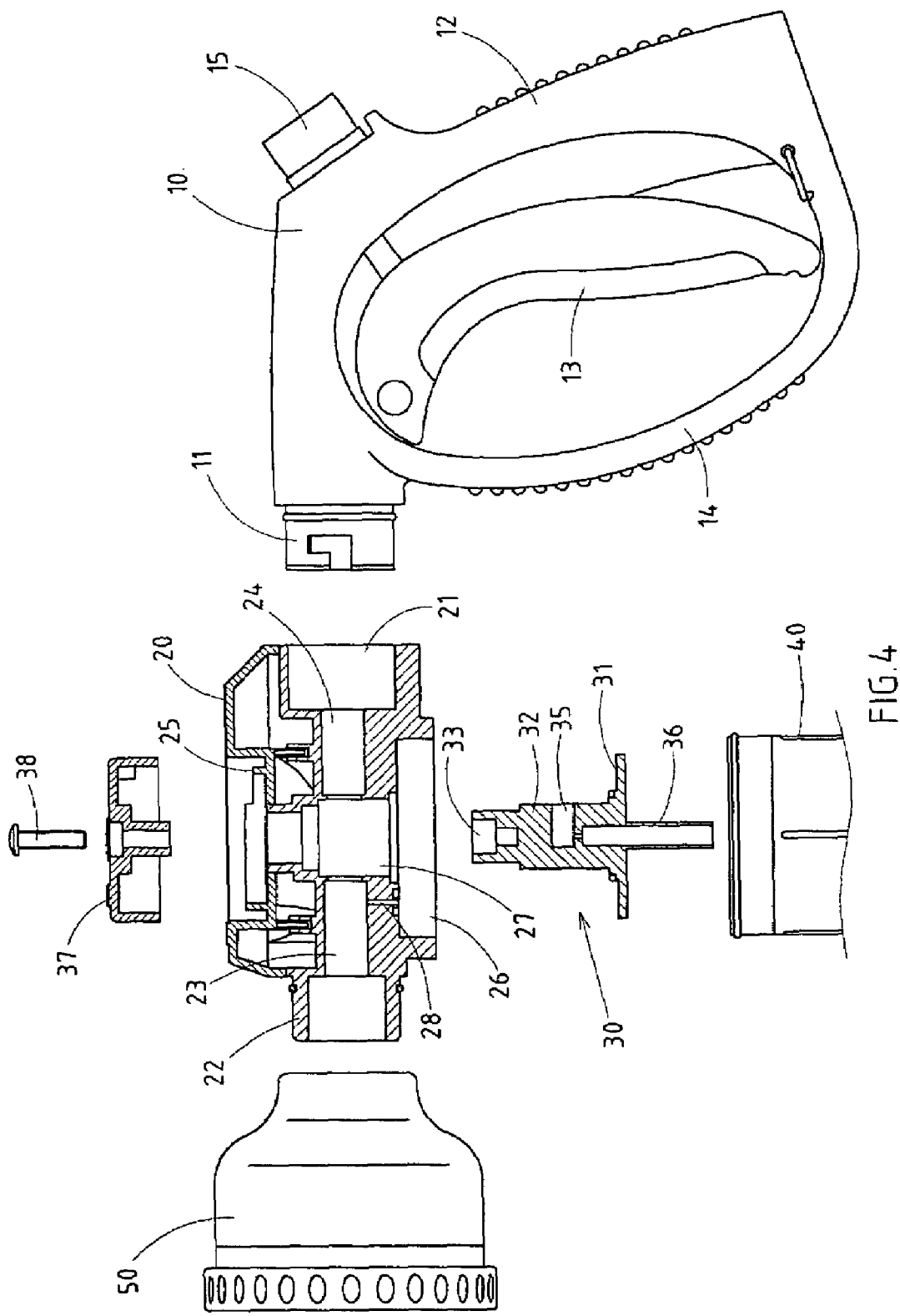

MANUAL CARWASH NOZZLE STRUCTURE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a manual carwash nozzle which is provided with means to dispense a cleansing substance.

BACKGROUND OF THE INVENTION

There are a variety of conventional manual carwash nozzles; nevertheless they have never caught the fancy of the consumer at large. This is due to the fact that the conventional nozzles are relatively heavy, and that they are incapable of dispensing an appropriate mixture of water and a cleansing substance in a consistent manner.

BRIEF SUMMARY OF THE INVENTION

The primary objective of the present invention is to provide a manual carwash nozzle structure which is relatively light in weight and is free of the deficiencies of the conventional counterparts described above.

The manual carwash nozzle structure of the present invention comprises a grip body, a barrel member, and a spray nozzle. The barrel member is fastened between the grip body and the spray nozzle and is formed of a connection body, an adjustment valve, and a container for holding a cleansing agent. The connection body is provided with a water inlet and a mixture outlet. The water inlet is in communication with a water duct of the grip body, whereas the mixture outlet is in communication with the spray nozzle. The adjustment valve is provided with a water admission hole, a guide tube, and an alignment hole. A portion of the incoming water of the water duct of the grip body is allowed to enter the container via the water admission hole and the guide tube. The mixture of water and the cleansing agent is let out of the container to converge with other portion of the incoming water via the alignment hole of the adjustment valve and an output hole of the connection body.

The features and the advantages of the present invention will be more readily understood upon a thoughtful deliberation of the following detailed description of a preferred embodiment of the present invention with reference to the accompanying drawings.

BRIEF DESCRIPTION OF THE SEVERAL VIEWS OF THE DRAWINGS

FIG. 4 shows an exploded perspective view of the barrel member of the preferred embodiment of the present invention.

DETAILED DESCRIPTION OF THE INVENTION

Figure 1:
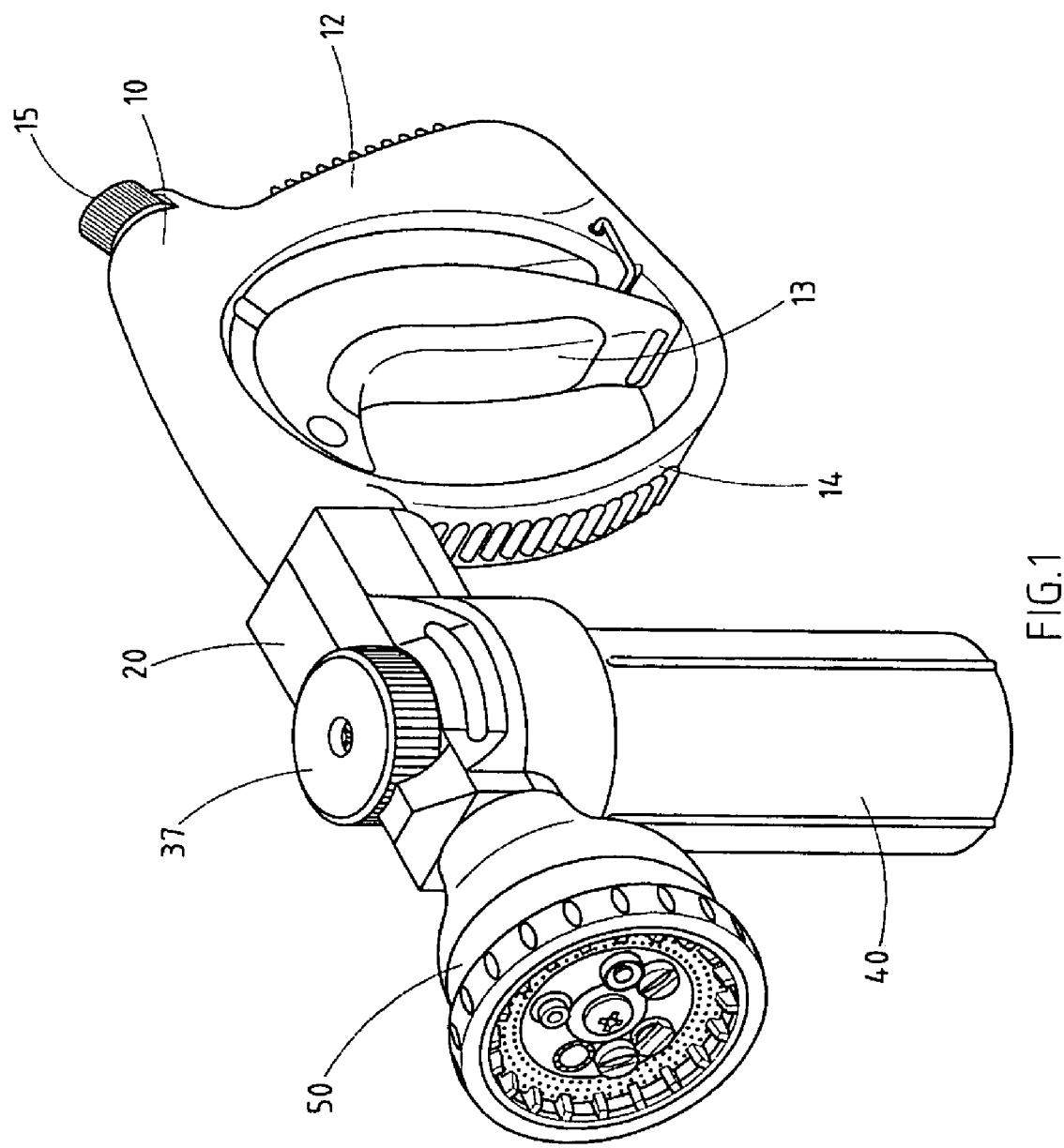
FIG. 1 shows a perspective view of the preferred embodiment of the present invention.
Figure 2:
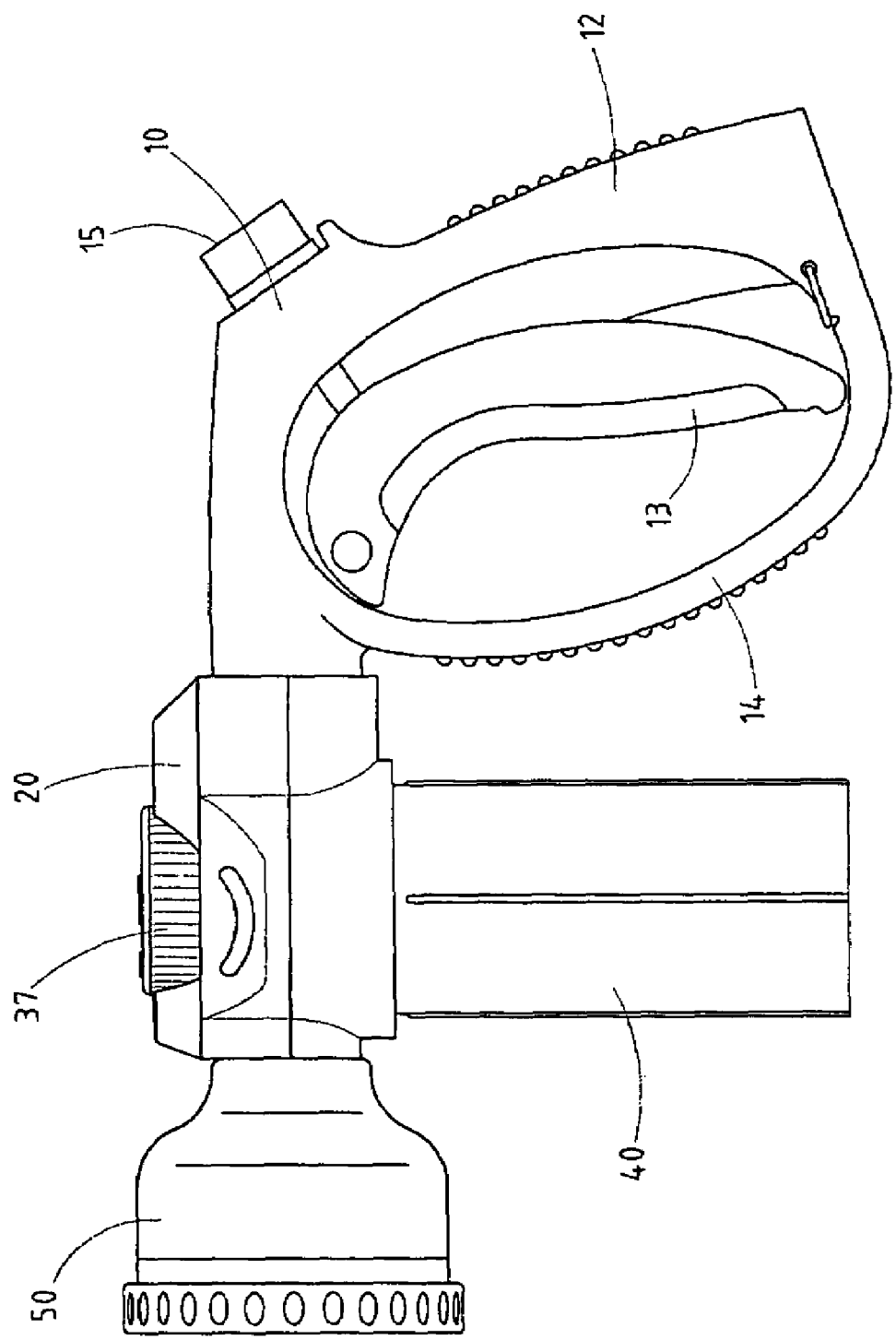
FIG. 2 shows a schematic plan view of the preferred embodiment of the present invention.
Figure 3:
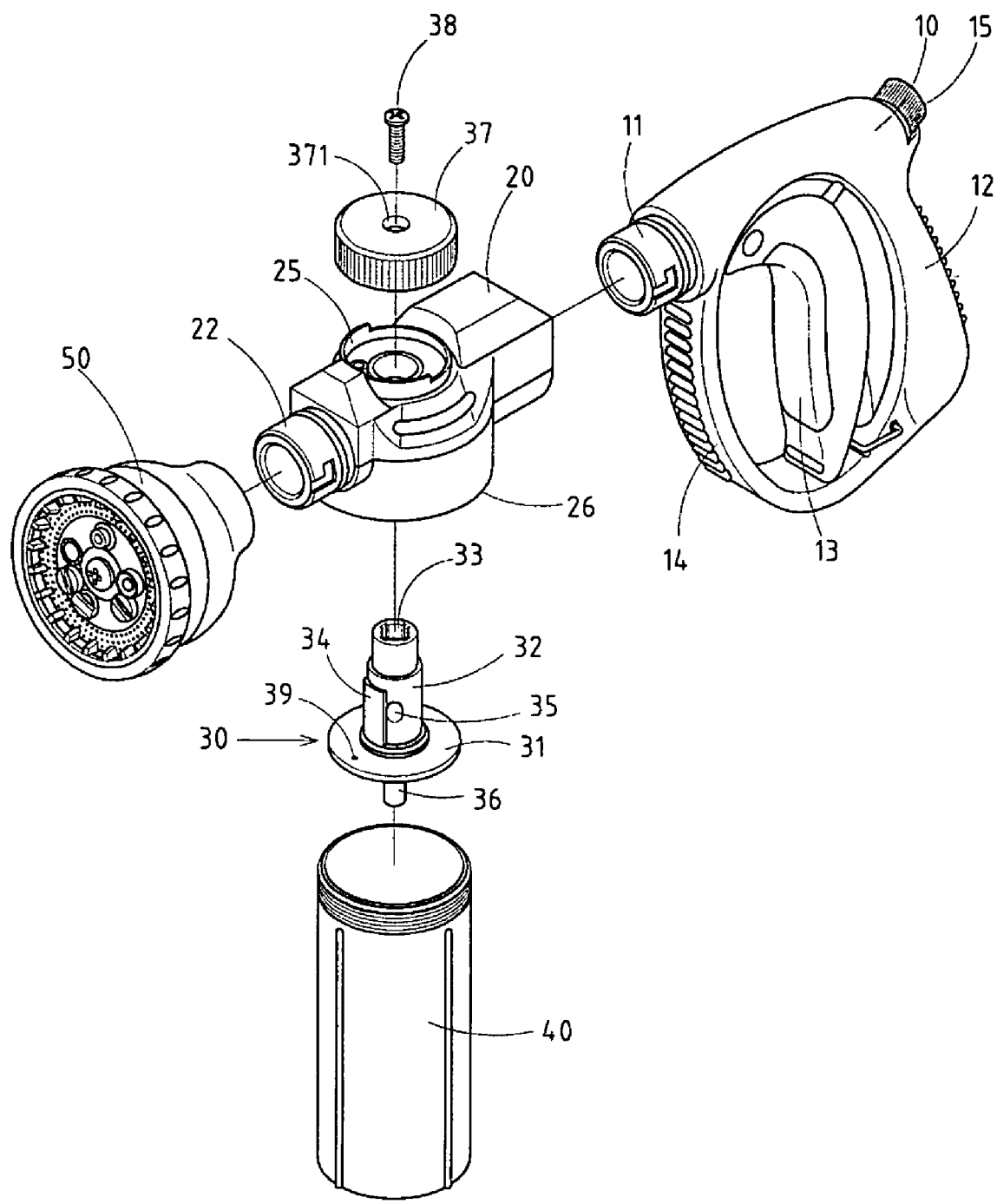
FIG. 3 shows an exploded perspective view of the preferred embodiment of the present invention.

As shown in FIGS. 1–8, a manual carwash nozzle structure of the present invention comprises a grip body 10, a barrel member, and a spray nozzle 50. The barrel member is located between the grip body 10 and the spray nozzle 50 and is the subject matter of the present invention.

The grip body 10 is provided with a water duct 11, a grip portion 12, a trigger 13, a protective shield 14, and a hose connector 15 in communication with the water duct 11.

The barrel member is formed of a connection body 20, an adjustment valve 30, and a detergent container 40. The connection body 20 is provided at one end with a first connection portion 21, which is joined with a protruded end of the water duct 11 of the grip body 10. The connection body 20 is provided at the other end with a second connection portion 22, which is joined with the spray nozzle 50. The connection body 20 is further provided in the interior with a water outlet 23 in communication with the spray nozzle 50, and a water inlet 24 in communication with the water duct 11 of the grip body 10. The connection body 20 is provided in the top of a midsegment with a mounting slot 25, and in the underside of the midsegment with a receiving slot 26 opposite to the mounting slot 25. Located between the mounting slot 25 and the receiving slot 26 is a valve hole 27 perpendicular to the water outlet 23 and the water inlet 24. An output hole 28 is located in the top wall of an outer end of the receiving slot 26 such that the output hole 28 is in communication with the water outlet 23.

Figure 5:
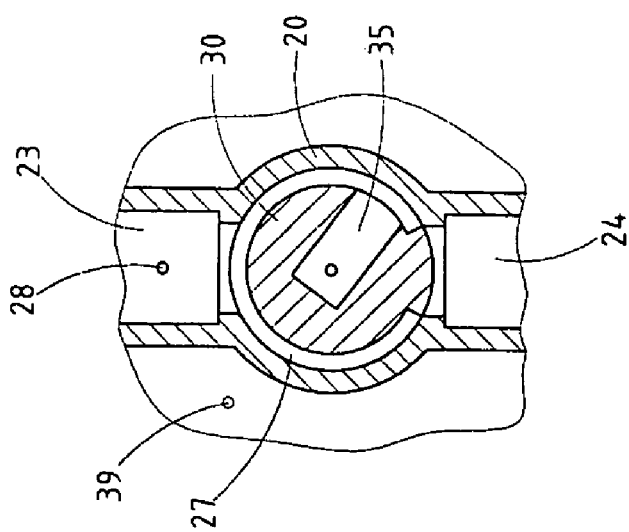
FIG. 5 shows a schematic view of the barrel member of the preferred embodiment of the present invention in a closed state.

The adjustment valve 30 is formed of a flange 31, a projection 32 extending upwardly from the flange 31, a threaded hole 33 located at the top end of the projection 32, an arcuate piece 34 embracing the outer wall of the lower half portion of the projection 32. The projection 32 is provided with a water admission hole 35 which is located in proximity of the arcuate piece 34 and is horizontally extended into the interior of the projection 32. The flange 31 is provided in the underside with a guide tube 36 in communication with the water admission hole 35. The adjustment valve 30 is joined with the connection body 20 such that the projection 32 is inserted into the valve hole 27 of the connection body 20, and that the arcuate piece 34 can be relocated to block the water inlet 24 of the connection body 20, as illustrated in FIG. 5. The flange 31 is located in the receiving slot 26 of the connection body 20. The projection 32 is fastened with an adjustment knob 37 by a fastening bolt 38 which is engaged with the threaded hole 33 of the top of the projection 33 via a through hole 371 of the adjustment knob 37. As a result, the adjustment valve 30 can be turned by the adjustment knob 37. The flange 31 is provided with an alignment hole 39.

The detergent container 40 is mounted at the top end in the receiving slot 26 of the connection body 20 such that the top end of the container 40 comes in contact with the flange 31, and that the guide tube 36 is extended into the interior of the container 40.

Figure 7:
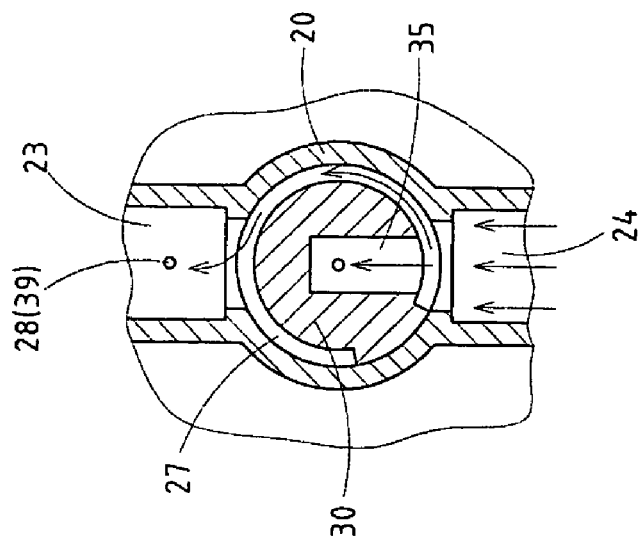
FIG. 7 shows a schematic view of the water flow path at the time when an output hole and an alignment hole of the barrel member of the preferred embodiment of the present invention are in alignment with each other.
Figure 6:
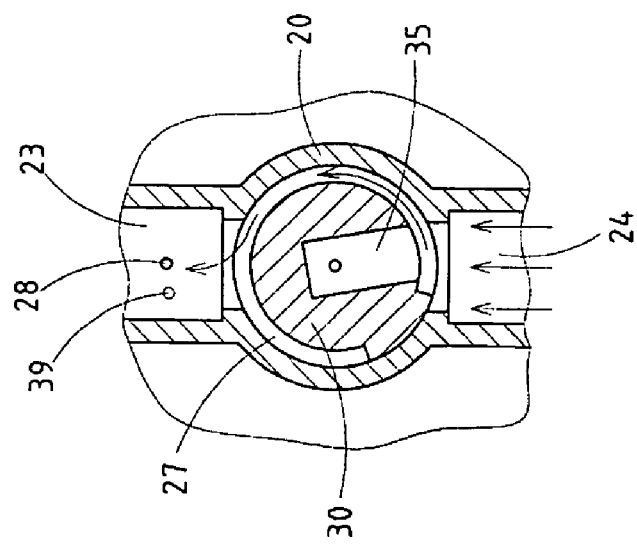
FIG. 6 shows a schematic view of the water flow path of the barrel member of the preferred embodiment of the present invention.
Figure 8:
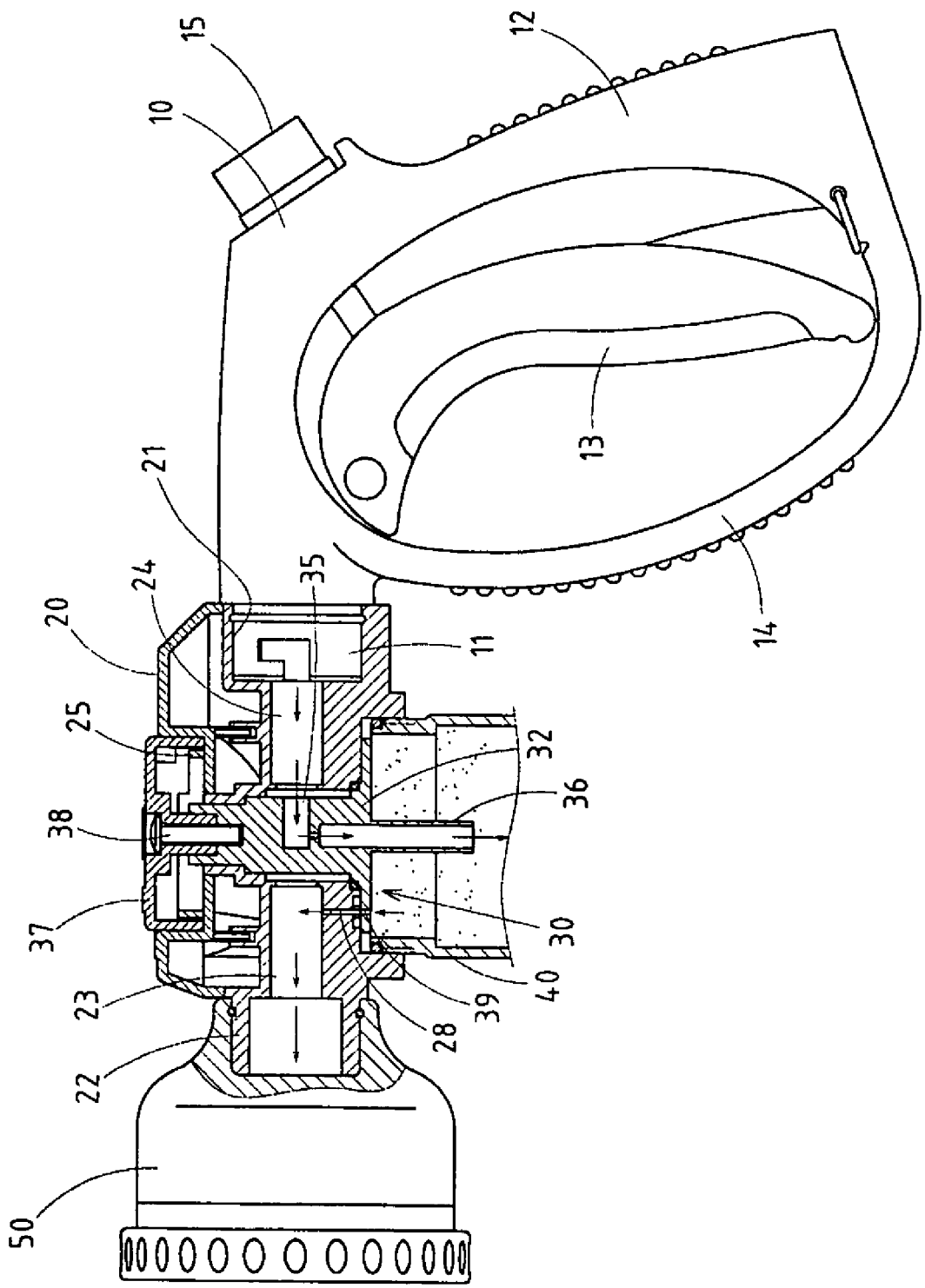
FIG. 8 shows a sectional schematic view of the preferred embodiment of the present invention in action.

As illustrated in FIG. 6, when only water is emitted by the spray nozzle 50, the water flows from the water inlet 24 to the water outlet 23 via the lower half portion of the projection 32. When the detergent is needed, the adjustment knob 37 is so turned that the water admission hole 35 is aligned with the water inlet 24, as shown in FIGS. 7 and 8. Meanwhile, the alignment hole 39 of the flange 31 is aligned with the output hole 28 of the connection body 20. As a result, the water admission hole 35, the guide tube 36, the detergent container 40, the alignment hole 39, and the output hole 28 are in communication with one another. A portion of the incoming water in the water inlet 24 enters the detergent container 40 from the water admission hole 35. A mixture of water and detergent is let out of the detergent container 40 to reach the water outlet 23 via the alignment hole 39 and the output hole 28 in communication with the alignment hole 39, as illustrated in FIGS. 7 and 8. The water-detergent mixture converges with other portion of the incoming water in the water outlet 23 before the mixture reaches the spray nozzle 50, as illustrated in FIG. 8.

The embodiment of the present invention described above is to be regarded in all respects as being illustrative and nonrestrictive. Accordingly, the present invention may be embodied in other specific forms without deviating from the spirit thereof. The present invention is therefore to be limited only by the scope of the following claim.

I claim:

1. A manual carwash nozzle structure comprising:
    a grip body provided with a hand grip, a trigger, a hose connector, and a water duct in communication with the hose connector;
    a barrel member fastened at one end with the grip body; and
    a spray nozzle in communication with the water duct of the grip body via the barrel member;
    wherein said barrel member is formed of:
        a connection body provided at one end of an interior with a water inlet, at other end of the interior with a water outlet in alignment with said water inlet, and in a center of the interior with a valve hole perpendicular to said water inlet and said water outlet, said connection body further provided in a top with a mounting slot corresponding in location to said valve hole, and in an underside with a receiving slot opposite to said mounting slot, said receiving slot being in communication with said water outlet via an output hole of said connection body;
        an adjustment valve formed of a projection extending from one side of a flange, a guide tube extending from other side of said flange, and an adjustment knob which is rotatably mounted in said mounting slot of said connection body and is fastened with said projection that is located in said valve hole of said connection body, with said flange being in an intimate contact with a top wall of said receiving slot of said connection body, said flange being provided with an alignment hole, said projection being provided with a water admission hole in communication with said water inlet of said connection body and said guide tube; and
        a container for holding a cleansing substance, said container being fastened at a top end in said receiving slot of said connection body such that the top end of the container comes in contact with said flange of said adjustment valve, and that said guide tube of said adjustment valve extends into the interior of said container;
        one portion of an incoming water in said water inlet of said connection body being allowed to enter said container via said water admission hole of said projection and said guide tube at the time when said projection is turned by said adjustment valve in such a manner that said water admission hole of said projection is aligned with said water inlet of said connection body, thereby resulting in alignment of said alignment hole of said flange with said output hole of said connection body, so as to allow a water mixture to flow from the interior of said container into said water outlet of said connection body via said alignment hole and said output hole.

* * * * *